United States Patent [19]

Hattori

[11] 4,305,100
[45] Dec. 8, 1981

[54] LIGHT SCANNING DEVICE

[75] Inventor: Nobuoto Hattori, Hachioji, Japan

[73] Assignee: Olympus Optical Company Limited, Tokyo, Japan

[21] Appl. No.: 166,462

[22] Filed: Jul. 7, 1980

[30] Foreign Application Priority Data

Jul. 9, 1979 [JP] Japan .................................. 54-86613

[51] Int. Cl.³ .......................... H04N 1/12; H04N 1/24
[52] U.S. Cl. ..................................... 358/294; 358/293
[58] Field of Search ................ 358/294, 293, 285, 213

[56] References Cited

U.S. PATENT DOCUMENTS

| 4,149,197 | 4/1979 | Kos | 358/294 |
| 4,189,753 | 2/1980 | Parsons | 358/294 |
| 4,247,874 | 1/1981 | Kos | 358/294 |

Primary Examiner—Howard Britton
Attorney, Agent, or Firm—Fleit & Jacobson

[57] ABSTRACT

A light scanning device comprising a number of photoelectric conversion elements arranged beneath a light transmission member along the main scanning direction for a manuscript and spaced apart from each other by a given pitch and an opaque member disposed on the light transmission member and provided therein with openings each opposed to each of the photoelectric conversion elements.

4 Claims, 7 Drawing Figures

LIGHT SCANNING DEVICE

BACKGROUND OF THE INVENTION

1. Field of the Invention

This invention relates to a light scanning device which is operative to scan a manuscript image in facsimile, for example.

2. Description of the Prior Art

Various types of the above mentioned light scanning device have heretofore been proposed. In a conventional light scanning device, a manuscript moving in one direction is illuminated with light emitted from a light source and the light reflected from the manuscript is projected through a projection lens onto a charge coupled device composed of a number of minute photoelectric conversion elements linearly arranged in a main scanning direction perpendicular to the moving direction of the manuscript, thereby scanning the manuscript. Such conventional light scanning device has drawbacks that since the projection lens is limited in its effective picture angle, the use of a manuscript whose width in the main scanning direction is 210 mm requires to separate the charge coupled device from the manuscript by a distance of 300 to 400 mm, thereby making the device large in size.

In order to eliminate such drawback, another light scanning device has been proposed and described in U.S. Pat. No. 4,149,197 in which the image of a manuscript is directly guided onto photoelectric conversion elements.

Such conventional light scanning device comprises a transparent substrate, an opaque member disposed on one of the surfaces of the transparent substrate and provided therein with a number of openings arranged along the main scanning direction for the manuscript and distant apart from each other by a given pitch, a number of photoelectric conversion elements disposed on the opaque member and formed of CdS, silicon or the like, each element having an opening aligned with each opening of the opaque member and having a size somewhat larger than that of the latter, and a transparent partition plate covering the upper surface of the photoelectric conversion elements. A manuscript disposed on the transparent partition plate is moved in an auxiliary scanning direction and illuminated with light emitted from a light source arranged at the other side of the transparent substrate. The manuscript image thus obtained is incident on each photoelectric conversion element, thereby scanning the manuscript.

In such conventional light scanning device, the light reflected from the manuscript is directly received by the photoelectric conversion element arranged at a position adjacent to the manuscript scanning position. As a result, it is possible to make the device as a whole small in size. But, such conventional light scanning device has drawbacks that each minute photoelectric conversion element must be provided with the opening, and that this opening is required to be precisely aligned with the opening provided in the opaque member, thus rendering the manufacture extremely difficult. In addition, the manuscript is illuminated only with the light passed through the opening provided in each photoelectric conversion element and each photoelectric conversion element is provided at its center portion, where the light reflected from the manuscript is incident in the most efficient manner, with the opening so that that portion of the photoelectric conversion element which is provided with the opening receives no reflected light, thereby rendering the efficiency of utilizing the illumination light bad.

SUMMARY OF THE INVENTION

An object of the invention, therefore, is to provide a light scanning device which can eliminate the above described drawbacks which have been encountered with the prior art techniques, which has an excellent utility efficiency of illumination light, and which is easy in manufacture and small in size.

A feature of the invention is the provision of a light scanning device comprising a manuscript to be scanned, a light transmission member provided at that surface thereof which is opposed to said manuscript with an opaque member including a number of openings arranged along a main scanning direction of said manuscript and spaced apart from each other by a given pitch and provided at the other surface thereof with photoelectric conversion elements arranged in opposition to said openings, and a light supply lamp so arranged that said manuscript is illuminated at its scanning position with light rays emitted from said lamp and passed through said light transmission member and said openings provided in said opaque member, whereby the light rays reflected from the manuscript are incident through each of said openings provided in said opaque member and said light transmission member on said photoelectric conversion elements.

Further objects and features of the invention will be fully understood from the following detailed description with reference to the accompanying drawings, wherein:

DETAILED DESCRIPTION OF THE PREFERRED EMBODIMENT

Figure 1:
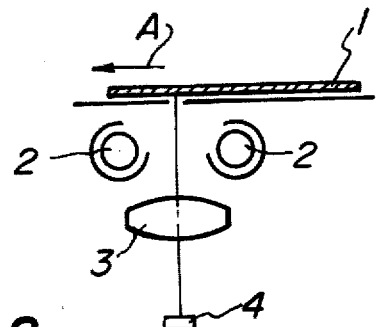
FIG. 1 is a diagrammatic view of a conventional light scanning device.

In a conventional light scanning device shown in FIG. 1, a manuscript 1 moving in a direction shown by an arrow A is illuminated with light emitted from a light source 2 and the light reflected from the manuscript 1 is projected through a projection lens 3 onto a charge coupled device 4 composed of a number of minute photoelectric conversion elements linearly arranged in a main scanning direction perpendicular to the moving direction of the manuscript 1 shown by the arrow A, thereby scanning the manuscript 1. Such conventional light scanning device has drawbacks that since the projection lens 3 is limited in its effective picture angle, the use of a manuscript whose width in the main scanning direction is 210 mm requires to separate the charge coupled device 4 from the manuscript 1 by a distance of 300 to 400 mm, thereby making the device large in size.

In order to eliminate such drawback, another light scanning device has been proposed and described in U.S. Pat. No. 4,149,197 in which the image of a manuscript is directly guided onto photoelectric conversion elements. Such conventional device is shown in FIGS. 2 and 3.

Figure 2:
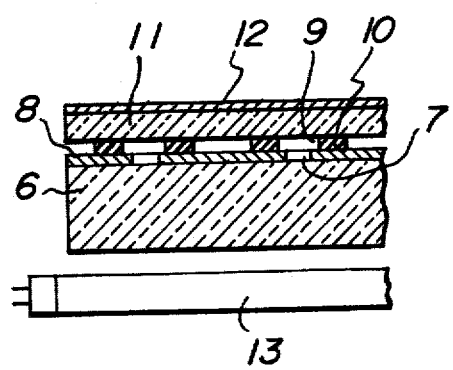
FIG. 2 is a partial cross-sectional view of another conventional light scanning device shown in section taken along a main scanning direction of a manuscript.
Figure 3:
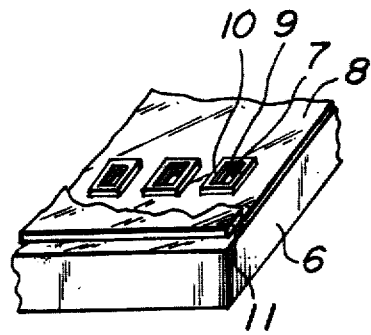
FIG. 3 is a partial perspective view of the light scanning device shown in FIG. 2, partly broken away.

FIG. 2 shows the conventional light scanning device in section taken along the main scanning direction and FIG. 3 shows the same device in partly broken away. Such conventional light scanning device comprises a transparent substrate 6, an opaque member 8 disposed on one of the surfaces of the transparent substrate 6 and provided therein with a number of openings 7 arranged along the main scanning direction for the manuscript and distant apart from each other by a given pitch, a number of photoelectric conversion elements 10 disposed on the opaque member 8 and formed of CdS, silicon or the like, each element 10 having an opening 9 aligned with each opening 7 of the opaque member 8 and having a size somewhat larger than that of the latter, and a transparent partition plate 11 covering the upper surface of the photoelectric conversion elements. A manuscript 12 disposed on the transparent partition plate 11 is moved in an auxiliary scanning direction perpendicular to the drawing surface of FIG. 2 and illuminated with light emitted from a light source 13 arranged at the other side of the transparent substrate 6. The manuscript image thus obtained is incident on each photoelectric conversion element, thereby scanning the manuscript 12.

In such conventional light scanning device, the light reflected from the manuscript 12 is directly received by the photoelectric conversion element 10 arranged at a position adjacent to the manuscript scanning position. As a result, it is possible to make the device as a whole small. But, such conventional light scanning device has drawbacks that each minute photoelectric conversion element 10 must be provided with the opening 9, and that this opening 9 is required to be precisely aligned with the opening 7 provided in the opaque member 8, thus rendering the manufacture extremely difficult. In addition, the manuscript 12 is illuminated only with the light passed through the opening 9 provided in each photoelectric conversion element 10 and each photoelectric conversion element 10 is provided at its center portion, where the light reflected from the manuscript 12 is incident in the most efficient manner, with the opening 9 so that portion of the photoelectric conversion element 10 which is provided with the opening 9 receives no reflected light, thereby rendering the efficiency of utilizing the illumination light bad.

Figure 4:
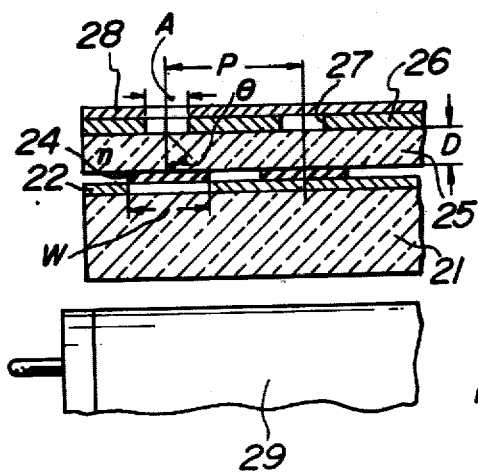
FIG. 4 is a partial cross-sectional view of one embodiment of a light scanning device according to the invention shown in section taken along a main scanning direction of a manuscript.
Figure 5:
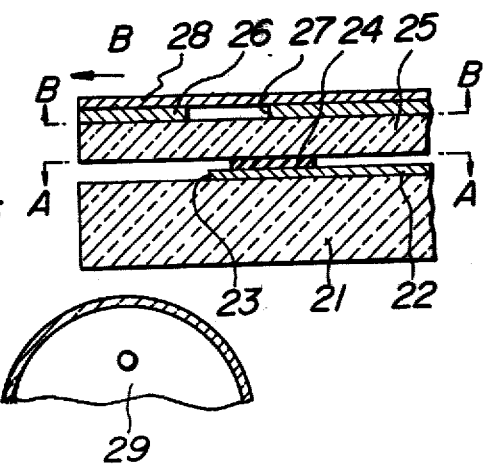
FIG. 5 is a partial cross-sectional view of the light scanning device shown in FIG. 4 and shown in section taken along an auxiliary scanning direction of the manuscript.
Figure 6:
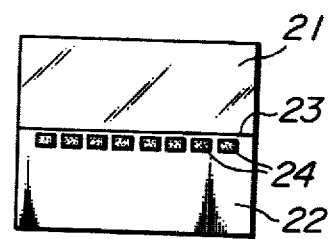
FIG. 6 is a section on line A—A' of FIG. 5 in a reduced scale.
Figure 7:
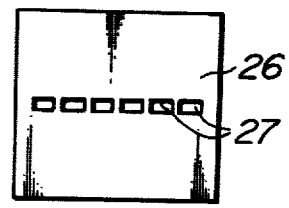
FIG. 7 is a section on line B—B' of FIG. 5 in a reduced scale.

FIGS. 4 and 5 show one embodiment of a light scanning device according to the invention in section taken along lines in the main and auxiliary scanning directions, respectively. FIG. 6 is a section on line A—A' of FIG. 5 in a reduced scale and FIG. 7 is a section on line B—B' of FIG. 5 in reduced scale. In the present embodiment, a transparent substrate 21 having a thickness of the order of about 2 mm is provided at one of surfaces thereof with a first opaque member 22 so as to divide the upper surface of the transparent substrate into a transparent portion and an opaque portion having a substantially straight line boundary 23 formed therebetween. On the first opaque member 22 are arranged a number of photoelectric conversion elements 24 aligned at a position distant apart from the boundary 23 by 5 to 10 μm and extending along the boundary line direction, preferably main scanning direction of the manuscript, the adjacent elements being distant apart from each other by a given pitch P. In the embodiment shown in FIG. 4, two photoelectric conversion elements 24 are shown in enlarged scale. But, in practice, a number of minute photoelectric conversion elements on the order of 300 to 20,000 may be arranged. Each of these great number of photoelectric conversion elements may be formed of CdS, silicon, charge coupled device, bucket brigade device or the like. On the great number of photoelectric conversion elements 24 is disposed a light transmission member 25 having a thickness of the order of substantially several tens μm to several mm. On this light transmission member is disposed a second opaque member 26. The second opaque member 26 is provided at those portions thereof which correspond to the photoelectric conversion elements 24 with openings 27. The light transmission member 25 may be formed of glass, vinyl resin, polyester resin, acryl resin, epoxy resin or the like. It is preferable that the first and second opaque members 22, 26 are formed by printing or vapor depositing metal and etching.

In the light scanning device constructed as above described, a manuscript 28 is disposed on the second opaque member 26 and a light supply lamp 29 is arranged at that surface side of the transparent substrate 21 which is opposed to the second opaque member 26, the light supply lamp 29 extending in a direction perpendicular to the auxiliary scanning direction shown by an arrow B in FIG. 5. The manuscript 28 is moved in the auxiliary scanning direction shown by the arrow B by means of a transfer means (not shown), illuminated with light emitted from the light supply lamp 29 and scanned. In this case, the manuscript 28 is illuminated with light emitted from the light supply lamp 29 and transmitted through the transparent substrate 21, light transmission member 25 and openings 27 formed in the second opaque member 26, and as a result, the manuscript 28 is illuminated with a sufficiently much amount of light.

On the contrary, in the conventional light scanning device shown in FIGS. 2 and 3, the manuscript 12 is illuminated with light emitted from the light supply lamp 13 and transmitted through the minute opening 9 provided in the center portion of the photoelectric conversion element 10, and as a result, the manuscript 12 is not illuminated with a sufficiently much amount of light.

The light reflected from the manuscript 28 is transmitted through the openings 27 provided in the second opaque member 26 and light transmission member 25 and received by the corresponding photoelectric conversion element 24. Thus, almost all of the reflecting light passing through the openings 27 can be received by the photoelectric conversion element 24. Thus, the light scanning device according to the invention has an excellent illumination efficiency and resolving power.

In the above described embodiment, a preferable relation among a width W of the photoelectric conversion element 24 in the main scanning direction, pitch P between adjacent photoelectric conversion elements 24, diameter A of the opening 27 provided in the second opaque member 26 and thickness D of the light receiving member 25 will now be described. Let the refractive index of the light transmission member 25 be n, the angle $\theta$ between an illumination light arriving at the surface of the light transmission member 25 and a line drawn at the point of arrival of the illumination light in a direction perpendicular to the surface of the light transmission member 25 is given by $$\theta = \sin^{-1}\frac{1}{n}.$$

The light ray incident on the surface of the light transmission member 25 at an angle which is larger than $\theta$ is subjected to total reflection on the surface of the light transmission member 25 and does not pass through the opening 27. As a result, the refractive light reflected by the manuscript 28 and passed through the light transmission member 25 propagates within a range defined by the angle given by $$\theta = \sin^{-1}\frac{1}{n}.$$

Thus, if the light leaving the end of the opening 27 and passing through the light transmission member 25 with the refractive angle $\theta$ is prevented from being incident on adjacent photoelectric conversion element 24, it is possible to sufficiently improve the resolving power. In this case, the dimension and pitch of the above mentioned members are given by $$\frac{1}{n} \leq \frac{P - \frac{A+W}{2}}{\sqrt{D^2 + \left(P - \frac{A+W}{2}\right)^2}}.$$

But, even when the refractive light passing through the opening 27 and arriving at the light transmission member 25 is more or less incident on a photoelectric conversion element adjacent to the corresponding photoelectric conversion element 24, a practically sufficient resolving power can be obtained. By taking this fact into consideration, the relation among the dimension and pitch of the above mentioned members are given without causing any trouble.

$$\frac{1}{n} \leq \frac{P - \frac{A+W}{2} \times 0.8}{\sqrt{D^2 + \left(P - \frac{A+W}{2} \times 0.8\right)^2}}.$$

As can be seen from the above, it is preferable that the light transmission member 25 is formed of glass or the like having a high refractive index. For example, if the light transmission member 25 is composed of a glass plate having a thickness D of 0.2 mm and refractive index n of 1.5 and A+W=0.14 mm, then P=0.25, that is, a resolving power of 4 lines/mm can be obtained.

The second opaque member 26 may be formed of material which does not transmit light. It is preferable that the second opaque member 26 has no mirror surface and is black in color. The second opaque member 26 thus constructed can absorb the incident illumination light and reduce the light reflected by the point of arrival of the incident illumination light. As a result, each photoelectric conversion element 24 is effectively prevented from being subjected to undesired incident light. The first opaque member 22 may be made integral with the transparent substrate 21 by printing, vapor deposition or the like. The second opaque member 26 may be made integral with the light transmission member 25 by printing, vapor deposition or the like.

As stated hereinbefore, the light scanning device according to the invention comprises a number of photoelectric conversion elements arranged beneath a light transmission member along the main scanning direction for a manuscript and spaced apart from each other by a given pitch and an opaque member disposed on the light transmission member and provided therein with openings each opposed to each of the photoelectric conversion elements and having a given size and hence is high in illumination light utilization efficiency and resolving power and small in size.

What is claimed is:

1. A light scanning device comprising a manuscript to be scanned, a light transmission member provided at that surface thereof which is opposed to said manuscript with an opaque member including a number of openings arranged along a main scanning direction of said manuscript and spaced apart from each other by a given pitch and provided at the other surface thereof with photoelectric conversion elements arranged in opposition to said openings, and a light supply lamp so arranged that said manuscript is illuminated at its scanning position with light rays emitted from said lamp and passed through said light transmission member and said openings provided in said opaque member, whereby the light rays reflected from the manuscript are incident through each of said openings provided in said opaque member and said light transmission member on said photoelectric conversion elements.

2. The device according to claim 1, wherein said opaque member, light transmission member and photoelectric conversion elements are superimposed one upon the other in the order as mentioned on a second opaque member disposed on a transparent substrate, said light source lamp being arranged at that side of said transparent substrate which is opposite to said second opaque member along the main scanning direction of said manuscript.

3. The device according to claim 1, wherein said light transmission member is formed of glass or the like having a high refractive index.

4. The device according to claim 1, wherein the thickness D and refractive index n of said light transmission member, the dimension A of each opening and pitch P between adjacent openings provided in said opaque member and dimension W of each photoelectric conversion element measured in the main scanning direction of said manuscript are given by $$\frac{1}{n} \leq \frac{P - \frac{A+W}{2} \times 0.8}{\sqrt{D^2 + \left(P - \frac{A+W}{2} \times 0.8\right)^2}}.$$

* * * * *